United States Patent
Tachtler et al.

(10) Patent No.: US 6,874,314 B2
(45) Date of Patent: Apr. 5, 2005

(54) VEHICLE WITH INTERNAL COMBUSTION ENGINE, FUEL CELL AND CATALYST

(75) Inventors: Joachim Tachtler, Ismaning (DE); Franz-Josef Wetzel, Gernlinden (DE)

(73) Assignee: Bayerische Motoren Werke AG, Munich (DE)

( * ) Notice: Subject to any disclaimer, the term of this patent is extended or adjusted under 35 U.S.C. 154(b) by 0 days.

(21) Appl. No.: 10/684,710

(22) Filed: Oct. 15, 2003

(65) Prior Publication Data

US 2004/0079075 A1 Apr. 29, 2004

Related U.S. Application Data

(63) Continuation of application No. PCT/EP02/03707, filed on Apr. 3, 2002.

(30) Foreign Application Priority Data

May 4, 2001 (DE) .......................................... 101 21 665

(51) Int. Cl.[7] ................................................ F01N 3/00
(52) U.S. Cl. ............................. 60/284; 60/274; 60/286; 60/303; 60/614; 429/19; 429/26
(58) Field of Search .......................... 60/274, 284, 286, 60/300, 303, 614, 616; 429/13, 19, 22, 26

(56) References Cited

U.S. PATENT DOCUMENTS

| | | | |
|---|---|---|---|
| 5,653,106 A | * | 8/1997 | Katashiba et al. ............. 60/300 |
| 5,845,485 A | * | 12/1998 | Murphy et al. ................ 60/274 |
| 6,352,792 B1 | * | 3/2002 | Parchamazad ................ 429/20 |
| 6,528,191 B1 | * | 3/2003 | Senner ......................... 429/12 |
| 6,562,496 B2 | * | 5/2003 | Faville et al. .................. 429/13 |
| 6,588,211 B2 | * | 7/2003 | Friebe et al. .................. 60/716 |

FOREIGN PATENT DOCUMENTS

| | | |
|---|---|---|
| DE | 195 37 800 A1 | 4/1996 |
| DE | 199 13 795 C1 | 10/2000 |
| DE | 199 24 777 A1 | 11/2000 |
| EP | 0 620 894 B1 | 1/1996 |
| EP | 0 943 787 A2 | 9/1999 |
| EP | 1 030 395 A2 | 8/2000 |
| EP | 1 057 998 A1 | 12/2000 |

OTHER PUBLICATIONS

International Search Report.

German Office Action.

* cited by examiner

*Primary Examiner*—Binh Q. Tran
(74) *Attorney, Agent, or Firm*—Crowell & Moring LLP

(57) ABSTRACT

A vehicle includes an internal combustion engine, a catalyst operatively associated with the internal combustion engine for processing exhaust gases of the internal combustion engine, and a fuel cell thermally coupled with the catalyst in such a manner that heat in waste gases of the fuel cell is supplied at least partially to the catalyst to heat the catalyst.

20 Claims, 1 Drawing Sheet

VEHICLE WITH INTERNAL COMBUSTION ENGINE, FUEL CELL AND CATALYST

CROSS REFERENCE TO RELATED APPLICATIONS

The present application is a continuation of International Patent Application No. PCT/EP02/03707, filed Apr. 3, 2002, designating the United States of America and published in German as WO 02/090733, the entire disclosure of which is incorporated herein by reference. Priority is claimed based on Federal Republic of Germany Patent Application No. 101 21 665.3, filed May 4, 2001.

SUMMARY OF THE INVENTION

The invention relates to a vehicle with an internal combustion engine, a fuel cell and a catalyst.

For vehicles with an internal combustion engine, which has a catalyst for treating the exhaust gases, it is known that the cold-starting phase is especially a problem. In this operating state, the catalyst is not yet at its operating temperature, so that it is not yet effective to the extent required. For this reason, a series of measures is known for bringing the catalyst during cold starting to its operating temperature as quickly as possible. Electrical heating of the catalyst is known as one of such measures. Furthermore, heating by burning a fuel is also known, for which the fuel, normally intended for the internal combustion engine, is used in a special burner for the catalyst. Moreover, it is known that the internal combustion engine, when started cold, can be operated under special conditions, so that, for example, particularly high exhaust gas temperatures or few polluting emissions result.

It is an object of the present invention to provide a further measure for heating the catalyst rapidly, especially in the cold-starting area.

This objective is accomplished with a vehicle that includes an internal combustion engine, a catalyst and a fuel cell. In the vehicle, at least a portion of the waste heat, developed in the fuel cell, is supplied to the catalyst by means of a thermal coupling between the fuel cell and the catalyst. In particular, the heat, contained in the waste gases, is made available to the catalyst.

This can be accomplished in accordance with one embodiment in which the hot waste gases of the fuel cell, at least when required, are supplied to the catalyst to heat the catalyst. If this measure is to be carried out only when the catalyst is not at its operating temperature or when the fuel cell generates waste gases with appropriate heat content, a switching device should be provided so that the waste gases are either supplied to the catalyst or discharged, for example, into the environment. For a special embodiment of the present invention, a control device is provided, which controls the switching device appropriately.

A different attempt to use the heat, stored in the waste gases of the fuel cell, includes providing a heat exchanger which is used to transfer a portion of the heat in the catalyst. A simple form of such a heat exchanger can be provided in the form of a spiral tube, which is disposed spirally about the catalyst. If the waste gases are passed through the spiral tube, they will heat the catalyst.

As is also the case with the first alternative, the waste gases can, alternatively, be passed through the heat exchanger in the cold starting phase. If the waste gases are not passed through the heat exchanger, they, as has already mentioned above, are emitted directly to the surrounding air.

In a particularly preferred embodiment, an afterburner is connected after the fuel cell. The still reactive combustion gas, which was not reacted in the fuel cell, are combusted in the afterburner, and the heat is then made available to the catalyst either directly or by way of a heat exchanger. Temperatures of up to 1,100° C. are attained by means of the afterburner. The afterburner can be connected to the circulating cooling water of the internal combustion engine, bringing this also up to temperature, as well as generate the heat for the catalyst.

The system introduced is of particular advantage if the fuel cell is operated before the internal combustion engine is started. In this case, the catalyst can be brought at least close to the operating temperature within a relatively short time, so that the disadvantages of a normal cold start can be avoided.

With the present invention, the catalysts in the exhaust gas system of an internal combustion engine can be brought thermally to their operating temperature by using the remaining heat of the waste gases of a fuel cell or of a downstream afterburner by having the waste gases flow directly through the catalyst or by way of a heat exchanger. With that, heating the catalyst electrically can be omitted.

Other objects, advantages and novel features of the present invention will become apparent from the following detailed description of the invention when considered in conjunction with the accompanying drawings.

BRIEF DESCRIPTION OF THE DRAWINGS

In the following, the present invention is explained in greater detail with reference to the attached drawings, in which.

DETAILED DESCRIPTION OF THE DRAWINGS

Figure 1:
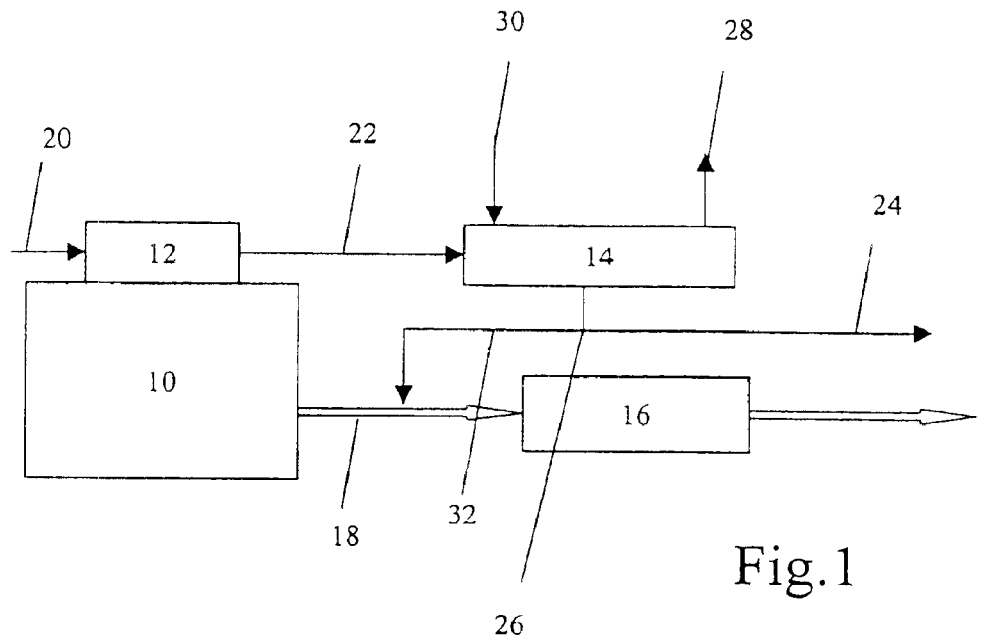
FIG. 1 shows a diagrammatic structural arrangement of a first embodiment of the inventive arrangement and FIG. 2 shows a diagrammatic structural arrangement, similar to that of FIG. 1, however of a second embodiment.
Figure 2:
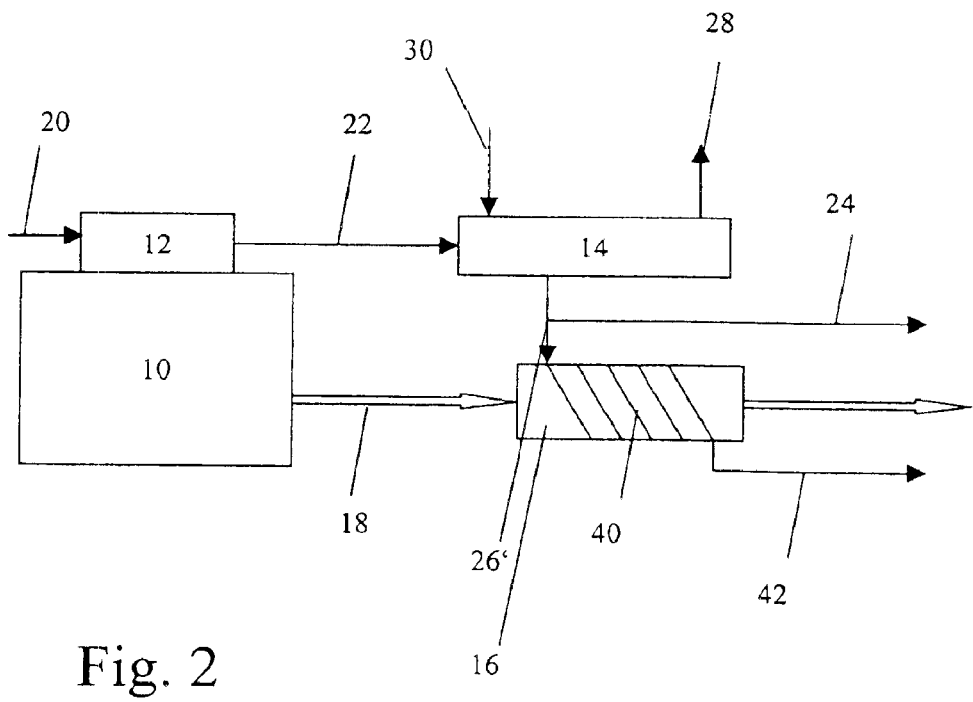

For the present embodiment of the invention, a system with an internal combustion engine 10, a fuel cell 12 and a catalyst 16 is shown diagrammatically in FIGS. 1 and 2. The internal combustion engine 10 is connected with the catalyst 16 by way of an exhaust gas pipeline 18, which in turn discharges the emissions, which have been subjected to an after treatment, to the environment.

A fuel cell 12 is coupled thermally with the internal combustion engine 10 and fastened structurally to the engine block. Over a feedline 20 (which is shown only diagrammatically), the fuel cell receives the reactants, which are required for the electrochemical reaction and are reacted in the fuel cell 12 depending on the energy required. The waste gases of the fuel cell are supplied over a waste gas pipeline 22 to an afterburner 14. The waste gases of the fuel cell contain, on the one hand, consumed reactants and, on the other, reactants, which have not yet been reacted with one another and, in accordance with an existing demand for power to be supplied by the fuel cell, have not been converted into electrical energy. These still reactive reactants are combusted in the afterburner 14 to produce heat, by means of which temperatures ranging up to 1,100° C. can be produced. The afterburner is coupled structurally with the circulating cooling water of the internal combustion engine, as indicated in FIG. 1 by the arrows 28 and 30, which are intended to indicate the inlet 30 of cooling water into and outlet 28 of cooling water out of the afterburner.

Moreover, the waste gases formed in the afterburner 14 are discharged from there. At a branch, labeled 26, which is provided with a switching valve, the details of which are not shown, the hot waste gases of the afterburner 14 can be switched into two different pipelines. On the one hand, the waste gases can be introduced into a pipeline 24, which discharges the waste gases into the environment. Moreover, the waste gases can also be supplied to a pipeline 18 upstream from the catalyst 16, so that they flow through the latter, heating it.

In the case of the alternative embodiment of FIG. 2, identical reference numbers refer to identical parts of the invention. The alternative embodiment of FIG. 2 differs from that of FIG. 1 only in that the hot waste gases from the afterburner 14 are not passed directly through the catalyst 16. Instead, a spiral helix 40, through which the waste gases can be passed alternatively using a switching valve 26' (the details of which, once again, are not shown), is placed around the catalyst. The waste gases from the afterburner 14 are then discharged once again to the environment at the end of the waste gas spiral 40.

Of course, hot waste gases from the fuel cell 12 can also be passed directly through the catalyst or along the outside of the catalyst, as shown in FIGS. 1 and 2. In that case, however, the waste gas temperatures are reduced from about 1,100° C. to below 800° C.

In a simple and structurally advantageous manner, the present invention ensures that, in the case of a system, including an internal combustion engine, an exhaust gas catalyst and a fuel cell, possibly with an afterburner, the coupling of heat is brought about between the fuel cell and afterburner on the one hand and the catalyst on the other, so that the heat, produced in the system of fuel cell and afterburner, can be used to heat the catalyst.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle comprising:
an internal combustion engine;
a catalyst operatively associated with the internal combustion engine for processing exhaust gases of the internal combustion engine; and
a fuel cell thermally coupled with the catalyst in such a manner that heat in waste gases of the fuel cell is supplied at least partially to the catalyst to heat the catalyst.

2. The vehicle of claim 1, wherein the fuel cell includes a waste gas pipeline that is connected with the catalyst in such a manner that hot waste gases from the fuel cell can be passed through the catalyst.

3. The vehicle of claim 2, wherein a switch, with which the waste gases can be passed through the catalyst or discharged to the atmosphere.

4. The vehicle of claim 1, further comprising a heat exchanger, via which the waste gases of the fuel cell transfer a portion of their heat to the catalyst.

5. The vehicle of claim 4, wherein the heat exchanger includes a helix tube, which is disposed spirally about the catalyst.

6. The vehicle of claim 5, further comprising an afterburner, in which unreacted reactants from the fuel cell are combusted and which is disposed between the fuel cell and at least one of the catalyst and heat exchanger.

7. The vehicle of claim 4, further comprising an afterburner, in which unreacted reactants from the fuel cell are combusted and which is disposed between the fuel cell and at least one of the catalyst and heat exchanger.

8. The vehicle of claim 3, further comprising an afterburner, in which unreacted reactants from the fuel cell are combusted and which is disposed between the fuel cell and at least one of the catalyst and heat exchanger.

9. The vehicle of claim 2, further comprising an afterburner, in which unreacted reactants from the fuel cell are combusted and which is disposed between the fuel cell and at least one of the catalyst and heat exchanger.

10. The vehicle of claim 1, further comprising an afterburner, in which unreacted reactants from the fuel cell are combusted and which is disposed between the fuel cell and at least one of the catalyst and heat exchanger.

11. A method for making a vehicle comprising the steps of:
operatively associating a catalyst with the internal combustion engine for processing exhaust gases of the internal combustion engine; and
thermally coupling a fuel cell with the catalyst in such a manner that heat in waste gases of the fuel cell is supplied at least partially to the catalyst to heat the catalyst.

12. The method of claim 11, further comprising the step of connecting a waste gas pipeline of the fuel cell with the catalyst in such a manner that hot waste gases from the fuel cell can be passed through the catalyst.

13. The method of claim 12, further comprising the step of providing a switch, with which the waste gases can be passed through the catalyst or discharged to the atmosphere.

14. The method of claim 11, further comprising the step of providing a heat exchanger, via which the waste gases of the fuel cell transfer a portion of their heat to the catalyst.

15. The vehicle of claim 14, further comprising the step of spirally disposing a helix tube of the heat exchanger about the catalyst.

16. The method of claim 15, further comprising the step of disposing an afterburner between the fuel cell and at least one of the catalyst and heat exchanger, in which afterburner unreacted reactants from the fuel cell are combusted.

17. The method of claim 14, further comprising the step of disposing an afterburner between the fuel cell and at least one of the catalyst and heat exchanger, in which afterburner unreacted reactants from the fuel cell are combusted.

18. The method of claim 13, further comprising the step of disposing an afterburner between the fuel cell and at least one of the catalyst and heat exchanger, in which afterburner unreacted reactants from the fuel cell are combusted.

19. The method of claim 12, further comprising the step of disposing an afterburner between the fuel cell and at least one of the catalyst and heat exchanger, in which afterburner unreacted reactants from the fuel cell are combusted.

20. The method of claim 11, further comprising the step of disposing an afterburner between the fuel cell and at least one of the catalyst and heat exchanger, in which afterburner unreacted reactants from the fuel cell are combusted.

* * * * *